US006070301A

United States Patent [19]

Fallandy

[11] Patent Number: 6,070,301

[45] Date of Patent: Jun. 6, 2000

[54] CUSHIONED HANDLE FOR WIRE CUTTING AND SEATING TOOL

[75] Inventor: Michael M. Fallandy, Ventura, Calif.

[73] Assignee: Harris Corporation, Melbourne, Fla.

[21] Appl. No.: 09/232,451

[22] Filed: Jan. 15, 1999

[51] Int. Cl.[7] ........................................ A47J 45/00

[52] U.S. Cl. .......................... 16/431; 16/902; 16/DIG. 12

[58] Field of Search .............................. 16/431, 430, 436, 16/421, DIG. 12, 902; 30/298, 232; 76/106, 119; 81/177.1, 489, 900, 20–22; 29/566.4, 751

[56] References Cited

U.S. PATENT DOCUMENTS

| | | |
|---|---|---|
| 3,089,525 | 5/1963 | Palmer . |
| 3,425,468 | 2/1969 | Soucy . |
| 4,936,586 | 6/1990 | Van Raemdonck . |
| 5,042,804 | 8/1991 | Uke et al. . |
| 5,362,046 | 11/1994 | Sims . |
| 5,704,259 | 1/1998 | Riehle . |
| 5,740,586 | 4/1998 | Gomas . |

*Primary Examiner*—Chuck Y. Mah
*Attorney, Agent, or Firm*—Charles E. Wands

[57] ABSTRACT

Hammer rebound shock and hand and wrist fatigue associated with the use of a wire seating and/or cutting tool, such as an impact tool, is alleviated by a covering at least the butt end of the tool handle with an internally ribbed cushioning sleeve of elastically deformable material, such as soft rubber. Because of its ribbed configuration and soft rubber material, the cushioning sleeve readily absorbs the rebound of the hammer impact force that would otherwise be transmitted through the handle in the course of operation of the tool, and thereby provides shock protection for the craftsperson's hand.

12 Claims, 1 Drawing Sheet

CUSHIONED HANDLE FOR WIRE CUTTING AND SEATING TOOL

FIELD OF THE INVENTION

The present invention relates in general to tools, such as impact tools of the type employed in the telephone industry for inserting one or more wires into electrical terminals of connector blocks of telephone office mainframes, and is particularly directed to a new and improved tool handle configuration, the butt end of which contains an internally ribbed, shock-absorbing sleeve of elastically deformable material, overlying a structurally rigid handle casing made of structurally robust (e.g., hard plastic) material.

BACKGROUND OF THE INVENTION

The telephone industry currently offers its craftspersons a variety of impact tool configurations for cutting and seating telephone wires in terminal blocks mounted to telephone office mainframe units. Non-limiting examples of documentation describing a variety of such impact tools include U.S. Pat. Nos. 5,195,230, 4,696,090, 4,567,639, and 4,241,496 and the patents cited therein. A typical mechanically operated impact tool has a generally longitudinal handle from which a wire-gripping and cutting head extends. The interior of the handle houses an axially translatable hammer element, which is biased by a compression spring to strike the cutting head, and cut a wire that has been inserted into a wire capture and gripping end region of the cutting head.

To operate the impact tool, the craftsperson firmly grips the tool's handle and pushes it by hand against a wire in a terminal receptacle. This moves a hammer release element within the handle into alignment with the hammer travel path, so that an impact force stored in a main compression spring is mechanically released against the hammer. This rapidly propels the hammer toward and into impact with the cutting head, causing the end of the wire to be cut and become seated in the terminal. Because the force imparted by the impact tool to the wire terminal is leveraged against and thereby imparts a recoil shock to the craftsperson's hand, frequent repeated use of the tool may lead to hand and wrist fatigue.

SUMMARY OF THE INVENTION

In accordance with the present invention, this potentially harmful rebound shock problem is substantially alleviated by a new and improved tool handle configuration containing an internally ribbed cushioning sleeve of elastically deformable material, such as soft rubber, that overlies at least the butt end of the structurally rigid handle casing in which an impact mechanism may be housed.

The structurally rigid casing may comprise molded hard plastic, or the like, having an interior hollow bore sized to accommodate a mechanism, such as a wire seating and/or cutting mechanism. The outer cushioning sleeve is formed, as by molding, such that interiormost portions of its interior surface are effectively conformal with the outer surface of the rigid casing. This ensures a snug, glove-like non-slip surface for the craftsperson to securely seize and grip the handle and operate the tool.

The butt end of the rigid casing has a substantially flat exterior surface that is abutted by a plurality of spaced apart shock-dampening or cushioning ribs that are formed into the butt end of the interior surface of the outer cushioning sleeve. The spaces between the ribs are sized to accommodate flexure of the outer cushioning sleeve, and thereby absorb shock, such as the rebound shock of an impact hammer force, that would otherwise be imparted to the craftsperson's hand in the course of operation of the tool. The spaces between the ribs may be devoid of material or they may contain compressible material such as open cell foam rubber.

DETAILED DESCRIPTION

Figure 1:
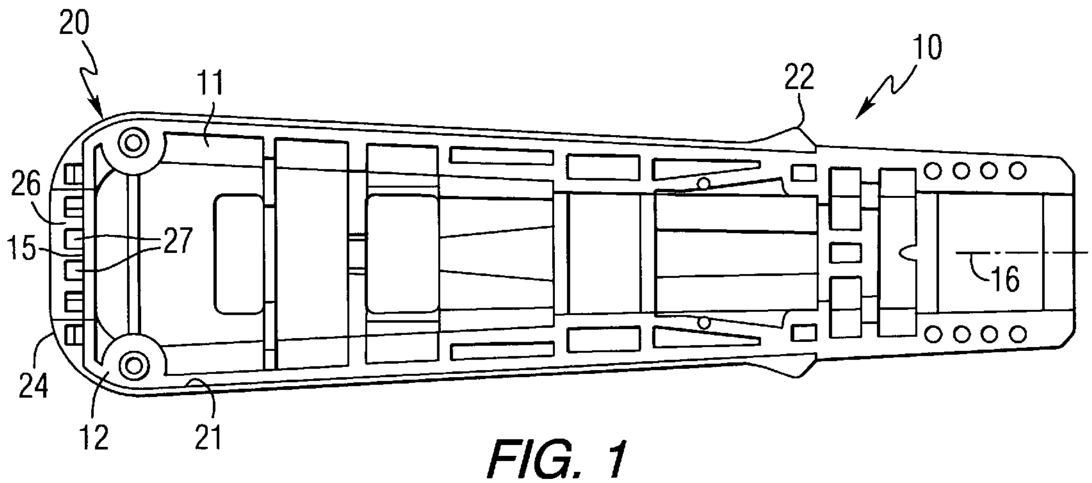
FIG. 1 is a diagrammatic plan view of one-half of a cushioned tool handle configuration in accordance with the invention, as may be employed for a craftsperson's tool for seating and/or cutting a wire.
Figure 2:
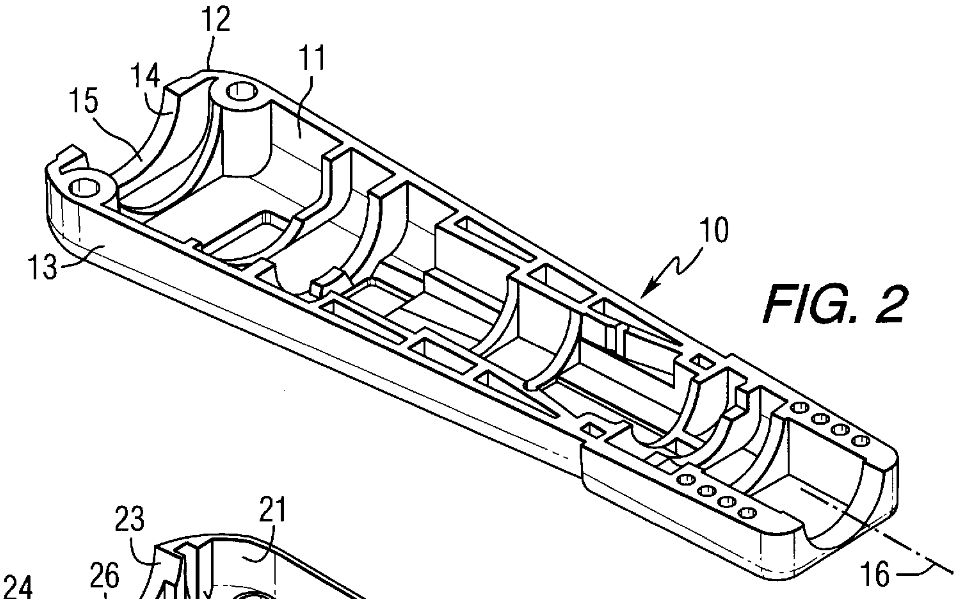
FIG. 2 is a diagrammatic perspective view of one half of the rigid handle casing of the cushioned tool handle configuration of FIG. 1.
Figure 3:
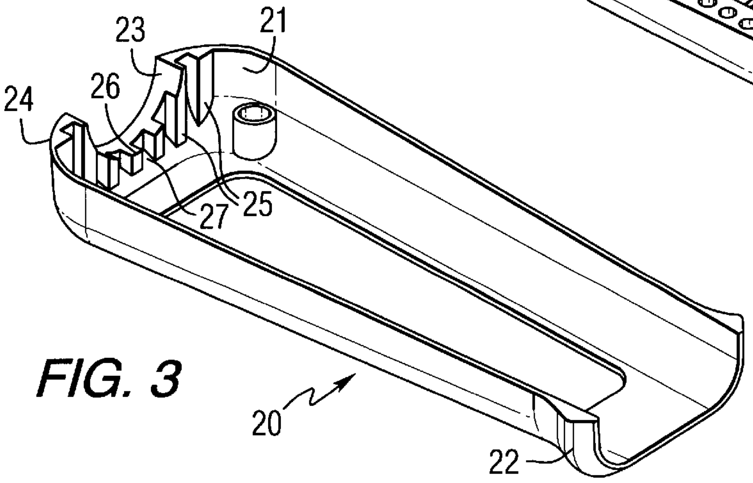
FIG. 3 is a diagrammatic perspective view of a half section of an internally ribbed, shock-absorbing sleeve that overlies the handle casing of FIG. 2.

Attention is now directed to FIGS. 1–3, which diagrammatically illustrate one half of an embodiment of a cushioned handle configuration in accordance with the invention, that may be incorporated in a craftsperson's tool, such as an impact tool for seating and/or cutting a wire, as described above. The other half of the handle is mirror-configured to that shown and joined therewith by suitable fasteners, such as screws, to provide a unitary handle architecture.

As shown in FIGS. 1–3, the cushioned tool handle comprises a housing or casing 10 of rigid material, such as hard neoprene plastic, as a non-limiting example, having an interior hollow bore 11 that is sized to accommodate therein a mechanism, such as wire seating and/or cutting impact mechanism. At least the butt end 12 of the handle casing 10 is surrounded by an outer cushioning layer or sleeve 20 of elastically deformable, grip enhancing material, such as high friction soft rubber.

The outer cushioning sleeve 20 is formed (e.g., molded) such that interiormost portions of its interior surface 21 are generally conformal with the exterior surface 13 of the casing 10, thereby providing a very snug, glove-like non-slip surface for the craftsperson to securely seize and grip the tool. A forwardmost end 22 of the outer cushioning sleeve 20 may be flared to define a user thumb-protection barrier.

In the non-limiting handle configuration of FIGS. 1–3, a generally circular aperture 14 is formed in the butt end 12 of the handle casing 10 to provide access to the interior bore 11. A similar aperture 23 is formed in the butt end 24 of the outer cushioning sleeve 20. It should be observed however, that the handle 10 may be configured without such an aperture, in which instance, a corresponding aperture would not be formed in the butt end of the outer cushioning sleeve.

The butt end 12 of the hollow casing 10 has a substantially flat exterior surface region 15 that is generally transverse to the axial dimension 16 of the handle 10. This flat surface region 15 is abutted by interiormost surfaces 25 of a plurality of shock-dampening or cushioning ribs 26 formed into the butt end 24 of the interior surface 21 of the outer cushioning sleeve 20. In the non-limiting example of FIGS. 1–3, the interior ribs 26 of the cushioning sleeve 20 are shown as being generally parallel to each other and transverse to the axial dimension 16 of the handle. It should be observed, however, that the dampening ribs may be oriented in other directions, such as extending radially from the center of the butt end of the handle.

The interior cushioning ribs 26 are separated from one another so as form spaces or pockets 27 therebetween. These spaces are sized to accommodate flexure of the outer cushioning sleeve 20, and thereby absorb a force or such associated with the use of the tool, such as the rebound shock of an impact hammer force, thereby protecting the craftsperson's hand in the course of operation of the tool.

In a preferred embodiment of the invention, the spaces 27 between the interior ribs 26 of the cushioning sleeve 20 are devoid of material, thereby allowing compression and flexure of the ribs as they dampen a force, such as an impact mechanism's hammer rebound shock. However, the spaces 27 may contain compressible material such as, but not limited to, open cell foam rubber, which may serve as an integrated constituent part of the shock-absorbing rib architecture of the butt end of the cushioning layer 20.

As will be appreciated from the foregoing description of the invention, the above-referenced rebound shock problem and resultant hand and wrist fatigue associated with the use of a craftsperson's tool, such as an impact tool, is substantially alleviated by providing the tool handle with an internally ribbed cushioning sleeve of elastically deformable material, such as soft rubber, that overlies at least the butt end of the handle casing in which an impact mechanism may be housed. Because of its configuration and soft rubber material, the internally ribbed surface of the outer cushioning sleeve readily absorbs a force, such as the rebound force of an impact mechanism hammer, that would otherwise be transmitted through the handle in the course of operation of the tool, and thereby provides shock protection for the craftsperson's hand.

While I have shown and described an embodiment in accordance with the present invention, it is to be understood that the same is not limited thereto but is susceptible to numerous changes and modifications as known to a person skilled in the art, and I therefore do not wish to be limited to the details shown and described herein but intend to cover all such changes and modifications as are obvious to one of ordinary skill in the art.

What is claimed:

1. A handle for a craftsperson's tool of the type for at least seating a wire, said handle comprising a hollow casing of rigid material that is sized to accommodate tool elements therein, and a cushioning layer of elastically deformable material overlying at least a butt end of said hollow casing, and wherein an interior surface of said cushioning layer adjacent to said butt end of said casing has a plurality of ribs with spaces therebetween to accommodate flexure of said elastically deformable material and thereby absorb force resulting from the operation of said tool.

2. A handle according to claim 1, wherein said spaces between said ribs of said cushioning layer adjacent to said butt end of said casing are devoid of material.

3. A handle according to claim 2, wherein said rigid material comprises a hard plastic material and said cushioning layer comprises pliable rubber material.

4. A handle according to claim 1, wherein said ribs of said cushioning layer are generally transverse to an axial dimension of said handle.

5. A handle according to claim 1, wherein said butt end of said hollow casing has a generally flat exterior surface, against which said plurality of ribs of said interior surface of said cushioning layer of elastically deformable material abut.

6. A handle according to claim 1, wherein said ribs of said cushioning layer are parallel to one another and generally transverse to an axial dimension of said handle.

7. A shock-absorbing handle for a craftsperson's impact tool for seating and cutting a wire, said handle comprising a casing of rigid material having an interior bore that is sized to house an impact tool mechanism therein, and a cushioning sleeve of elastically deformable material overlying and conformal with at least a butt end of said casing, and wherein an interior surface of said cushioning sleeve to said butt end of said casing is formed as a plurality of ribs with spaces therebetween to accommodate flexure of said elastically deformable material, and thereby absorb rebound shock of the tool impact force that would otherwise be imparted to the craftsperson's hand in the course of operation of the impact tool.

8. A shock-absorbing handle according to claim 7, wherein said spaces between said ribs of said cushioning layer adjacent to said butt end of said casing are devoid of material.

9. A shock-absorbing handle according to claim 8, wherein said ribs of said cushioning layer are generally transverse to an axial dimension of said handle.

10. A shock-absorbing handle according to claim 9, wherein said butt end of said hollow casing has a generally flat exterior surface, against which said plurality of ribs of said interior surface of said cushioning layer of elastically deformable material abut.

11. A shock-absorbing handle according to claim 10, wherein said rigid material comprises a hard plastic material and said cushioning layer comprises pliable, high friction material.

12. A shock-absorbing handle according to claim 11, wherein said ribs of said cushioning layer are parallel to one another.

* * * * *